United States Patent
Liu et al.

(10) Patent No.: US 7,089,312 B2
(45) Date of Patent: Aug. 8, 2006

(54) SYSTEM AND METHOD FOR REDUCING RETRANSMISSIONS DUE TO TUNNELED TCP-IN-TCP COMMUNICATION IN A NETWORK

(75) Inventors: Changwen Liu, Portland, OR (US); Prakash N. Iyer, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 681 days.

(21) Appl. No.: 09/957,823

(22) Filed: Sep. 20, 2001

(65) Prior Publication Data

US 2003/0055980 A1    Mar. 20, 2003

(51) Int. Cl.
    *G06F 15/16* (2006.01)
(52) U.S. Cl. ............... 709/227; 709/230; 709/232; 709/246
(58) Field of Classification Search .......... 709/227, 709/228, 238, 232, 245, 246, 230; 370/352
    See application file for complete search history.

(56) References Cited

U.S. PATENT DOCUMENTS

| | | | | |
|---|---|---|---|---|
| 6,101,543 | A * | 8/2000 | Alden et al. ............ | 709/229 |
| 6,137,791 | A * | 10/2000 | Frid et al. ............ | 370/352 |
| 6,208,620 | B1 * | 3/2001 | Sen et al. ............ | 370/231 |
| 6,496,505 | B1 * | 12/2002 | La Porta et al. ......... | 370/392 |
| 6,631,416 | B1 * | 10/2003 | Bendinelli et al. ....... | 709/227 |
| 6,711,147 | B1 * | 3/2004 | Barnes et al. ........... | 370/338 |
| 6,731,617 | B1 * | 5/2004 | Mizell et al. ........... | 370/328 |
| 6,742,044 | B1 * | 5/2004 | Aviani et al. ........... | 709/235 |
| 2002/0142774 | A1 | 10/2002 | Ylian | |
| 2002/0146016 | A1 | 10/2002 | Changwen | |

FOREIGN PATENT DOCUMENTS

EP           1011244 A2 *  6/2000

OTHER PUBLICATIONS

Gunter, M. et al. "An Architecture for Managing QoS-enabled VPNs over the Internet." Local Computer Networks, 1999. LCN'99 Conference on. Oct. 18-20, 1999. pp. 122-131.*

Partridge, Craig et al. "A Faster UDP". IEEE/ACM Transactions on Networking. vol. 1, No. 4 Aug. 1993. 429-440.*

(Continued)

*Primary Examiner*—Jason Cardone
*Assistant Examiner*—Jeffrey R. Swearingen
(74) *Attorney, Agent, or Firm*—Fish & Richardson P.C.

(57) ABSTRACT

A network includes a TCP-in-TCP tunnel between a mobile device, which includes a TCP client and a gateway, and a TCP server, which resides in a subnet. Another gateway in the subnet receives and caches TCP packets and acknowledgments (ACKs) from the TCP-in-TCP tunnel. In response to receiving an indication from the TCP server that it has not received a cached TCP packet, the second gateway may resend the packet without relaying the indication to the TCP client, and the first gateway may send a control message instead of a complete TCP packet to the second gateway.

25 Claims, 9 Drawing Sheets

OTHER PUBLICATIONS

Hari Balakrishnan, et. al., *Improving TCP/IP Performance over Wireless Networks*, In Proc. 1st ACM International Conference on Mobile Computing and Networking (Mobicom), Nov. 1995.

M. Allman, et. al., *TCP Congestion Control* [online]. RFC 2581, Apr. 1999 [retrieved on Jul. 15, 2005]. Retrieved from the Internet: <URL:www.faqs.org/rfcs/rfc2581.html>.

M. Mathias, et al., *TCP Selective Acknowledgement Options* [online]. RFC 2018, Oct. 1996 [retrieved on Jul. 15, 2005]. Retrieved from the Internet: <URL:www.faqs.org/rfcs/rfc2018.html>.

P. Srisuresh, et al., *IP Network Address Translator (NAT) Terminology and Consideration* [online]. RFC 2663, Aug. 1999 [retrieved on Jul. 15, 2005]. Retrieved from the Internet: <URL:www.faqs.org/rfcs/rfc2663.html>.

*CIPE-Crypto IP Encapsulation* [online]. Aug. 2004 [retrieved on Jul. 15, 2005]. Retrieved from the Internet: <URL: http://sites.inka.de/~bigred/devel/cipe.html>.

* cited by examiner

SYSTEM AND METHOD FOR REDUCING RETRANSMISSIONS DUE TO TUNNELED TCP-IN-TCP COMMUNICATION IN A NETWORK

BACKGROUND

Transmission Control Protocol (TCP) enables two nodes to establish a reliable connection and exchange streams of information over a network. Each stream of information may be split into TCP segments ("segments") at a transport layer that are each sent across the network as separate Internet Protocol (IP) packets ("packets" or "datagrams") at a network layer. When sent from a source to a destination, a TCP segment includes a sequence number and an acknowledgment number. The sequence number indicates a byte number for the first byte of information in the segment. The acknowledgment number indicates a byte number for the first byte of the next segment that the destination expects to receive from the source. The destination can use the sequence number associated with each segment to assemble the segments in the proper order.

When the destination receives a segment, it sends an acknowledgment to the source indicating the byte of the last segment that it has received and contiguously assembled in the stream. This acknowledgment indicates to the source that the destination has received all bytes up to and including the acknowledgment number minus one. The destination may also (or instead) send an acknowledgment of a non-contiguous segment through a mechanism such as Selective Acknowledgment (SACK).

If the source does not receive an acknowledgment for a sent segment within a certain amount of time or receives multiple duplicate acknowledgments, the source may assume that the segment has been lost in transmission to the destination and resend the segment. This certain amount of time can change dynamically, increasing (via an exponential backoff algorithm) with each lost segment to effectively allow more time for a subsequently sent segment to reach the destination and for the destination to acknowledge receipt of the subsequently sent segment.

TCP tunnels may be used when a packet traverses through at least one gateway device between a packet's original source and its ultimate destination. A TCP tunnel, which is essentially another TCP transmission layer, may provide security for and improve reliability of TCP packets tunneling through it. However, for TCP packets that are lost in sections not covered by the TCP tunnel, an end-to-end retransmission of packets may still be needed.

DETAILED DESCRIPTION

Figure 1:
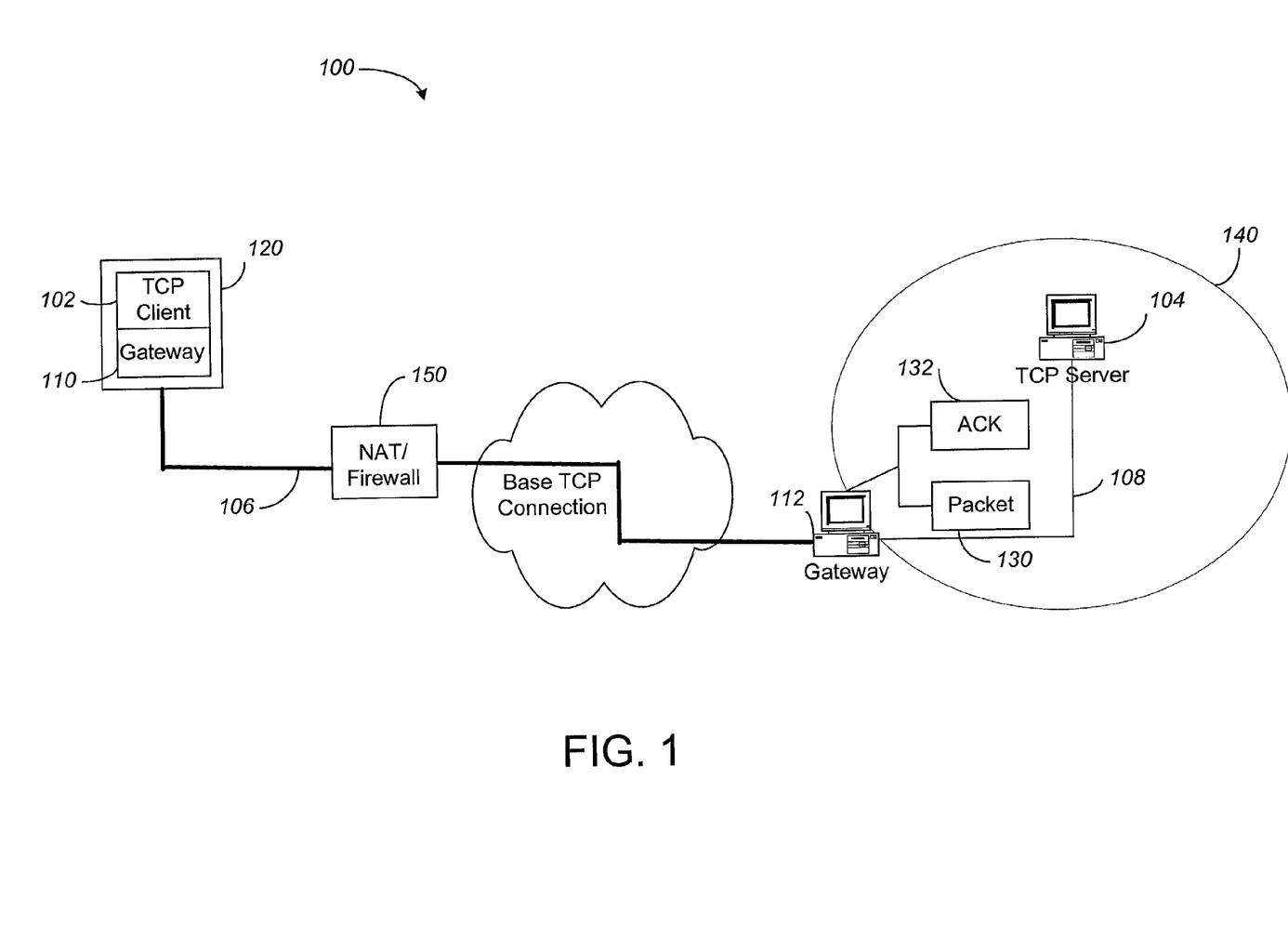
FIG. 1 is a block diagram describing a network including a TCP-in-TCP tunneled connection according to an embodiment.

A simplified network configuration 100 according to an embodiment is shown in FIG. 1. A client 102 and a server 104 can communicate with each other by transmitting streams of data across connected communication links 106 and 108 using the Transmission Control Protocol (TCP). Bytes of data in the data stream are grouped into TCP segments. TCP segments may include data, instructions, or a combination of the two.

The TCP segments may be formatted into Internet Protocol ("IP") packets (or "datagrams") for transmission across the network communication links 106 and 108. The IP packets may include TCP segments or fragments of TCP segments. Such packets may be referred to as TCP packets. Each sent TCP packet may be part of a packet stream, where each of the packets in the packet stream fits together to form a contiguous stream of data.

Figure 2:
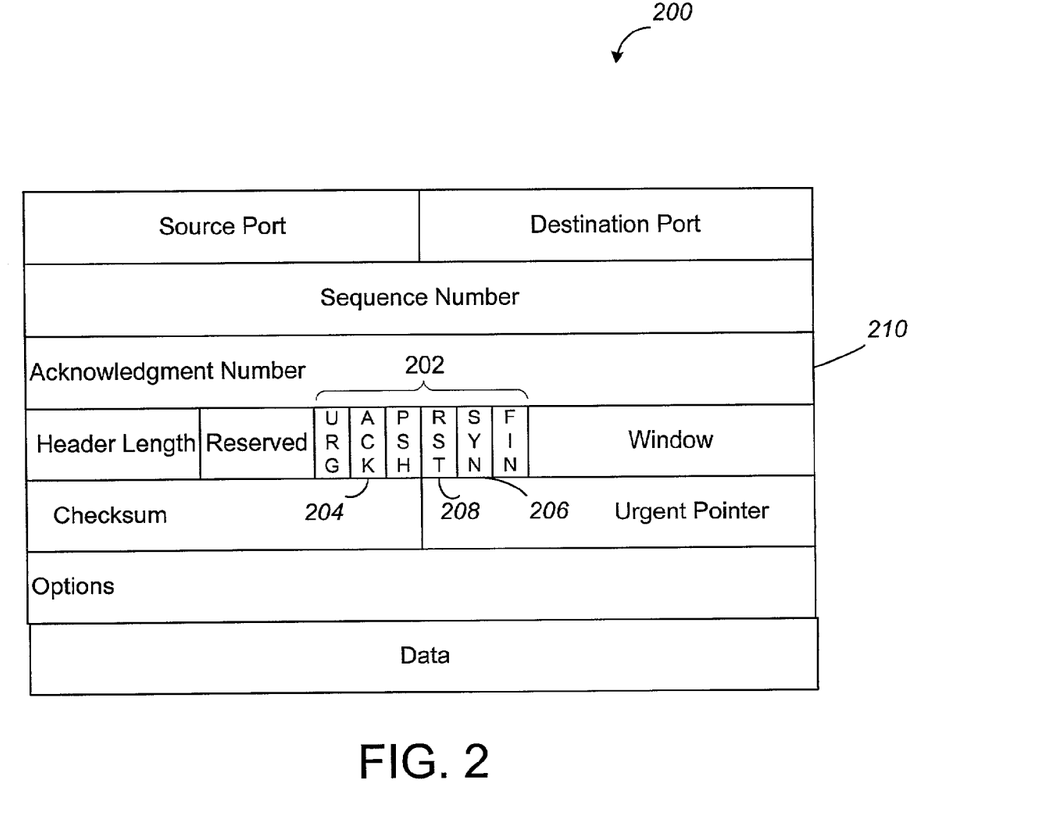
FIG. 2 is a block diagram describing the organization of a TCP segment.

FIG. 2 shows an example of a TCP segment 200 that may be sent between the client 102 and the server 104. The TCP segment 200 includes a group 202 of bits that indicates various states that may be present in the TCP protocol. These bit include an ACK bit 204, which indicates whether an acknowledgment number 210 is valid, a SYN bit 206, which establishes initial agreement on sequence numbers, and a RST bit 208, which indicates whether the connection between the client/server pair should be reset.

The communication link 106 between gateway 110 and gateway 112 includes a TCP tunnel, which is a TCP-based connection, also referred to as a base TCP connection. TCP tunnels are typically used when a packet traverses through at least one gateway device between a packet's original source and its ultimate destination.

When a packet is in a TCP tunnel over a public network such as the Internet, both the packet's header and payload are usually encrypted and compressed for bandwidth efficiency. Tunneling does not necessarily imply encryption however. A TCP packet's traversal through the TCP tunnel is referred to as TCP-in-TCP tunneling. The TCP connection whose packets traverse through the TCP tunnel may be referred to as the upper layer TCP, and the TCP layer that functions as the tunnel may be referred to as base layer TCP.

The client 102 and server 104 may communicate by transmitting upper layer TCP packets to each other. A client-side gateway 110 and a server-side gateway 112 encapsulate the upper layer TCP packets from the client 102 and server 104, respectively, in base layer TCP packets for transmission over the base TCP connection 106. Thus, the upper layer TCP packets transmitted between the client and server tunnel through the base TCP connection 106. The gateways 110, 112 receive transmitted base layer TCP packets from the base TCP connection 106 and decapsulate the packets as upper layer TCP packets for transmission to the client 102 and server 104, respectively.

In an embodiment, the TCP client 102 and gateway 110 reside on the same machine, for example, a mobile device 120 running gateway software. The gateway 110 is connected to the base TCP connection 106, which may include a wireless communication link. Packets transmitted from the client 102 en route to the server 104 may go through a Network Address Translation (NAT)/firewall 150.

The TCP server 104 and gateway 112 may reside in a subnet 140. The server 104 and gateway 112 are connected by communication link 108, which may be, for example, an Ethernet Local Area Network (LAN) connection or other type of network communication link. Base layer TCP packets sent by the mobile device 120 and received at the gateway 112 are transmitted to the server 104 over the communication link 108 as upper layer TCP packets.

TCP is a reliable transport mechanism. If a TCP packet gets lost in transmission between a sender and a receiver, a recovery process tries to recover the lost packet. In data transfers from the client 102 to the server 104, whenever upper layer TCP packets get lost, the server notifies the client in one of the following three ways: transmitting a selective acknowledgment (SACK), which selectively specifies missing TCP segments; transmitting duplicate ACKs (described below); or by transmitting no ACKs if no more segments are received. Correspondingly, the client in the mobile device 120 may recover the missing TCP packets in the following three ways: selectively retransmit the missing segments in TCP packets upon receipt of a SACK; initiate fast retransmission and recovery algorithm upon receipt of duplicate ACKS; or time out and retransmit the first missing segment according to congestion avoidance algorithm for the upper layer TCP when receiving no ACKs for a given timeout period.

Since TCP is a reliable transport mechanism, any base layer TCP packets lost in the base TCP connection 106 between the gateways 110, 112 would be recovered by one of the recovery mechanisms. This ensures that all upper layer TCP packets that tunnel through the base TCP connection 106 will arrive at their destination, i.e., the client-side gateway 110 or the server-side gateway 112. Also, since the TCP client 102 and client-side gateway 110 reside on the same machine, all segments in the upper layer TCP packets from the client 102 arrive at the client-side gateway 110 in order and without fragmentation. Consequently, it may be assumed that any losses of upper layer TCP packets in the network 100 will occur only in the communication link 108 between the server 104 and the gateway 112.

In an embodiment, the server-side gateway 112 includes a TCP packet cache 130 and a TCP acknowledgment (ACK) cache 132. The gateway 112 may use the information stored in the caches 130 and 132 to reduce the retransmission of upper layer TCP packets from the mobile device 120 to the server 104, and hence reduce traffic and congestion on the base TCP connection 106. SACKs and duplicate ACKs may be hidden from the mobile device 120, and the amount of data retransmitted due to a retransmission timeout may be reduced from a full TCP packet to only a control message across the base TCP connection 106.

Figure 3:
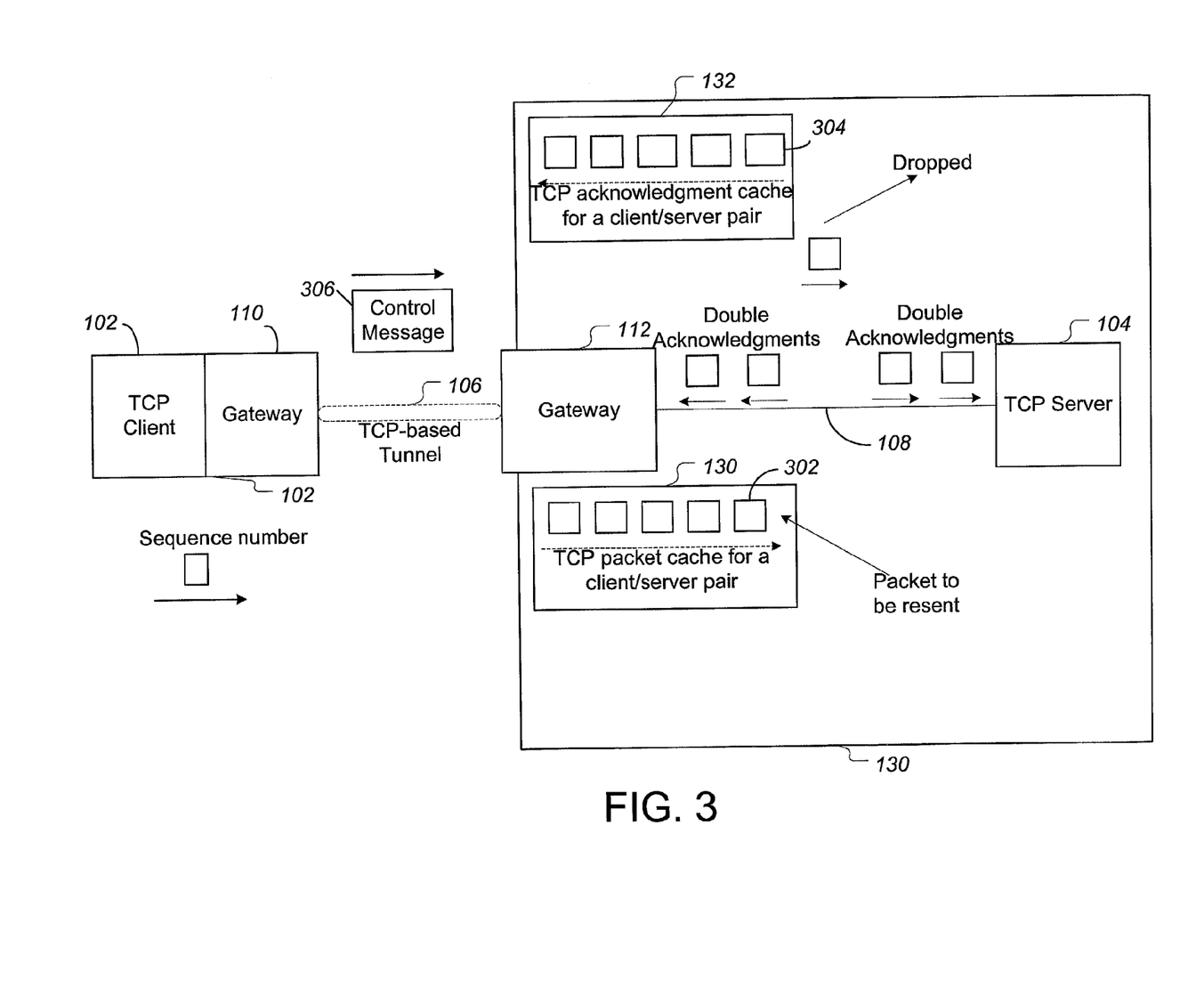
FIG. 3 describing packet and acknowledgment (ACK) transmission between a gateway and server in a subnet.

The TCP packet cache 130 holds all tunneled upper layer TCP packets 302 that are sent to the server, but have not been acknowledged by the server, as shown in FIG. 3. Each cached TCP packet is marked by its resending multiplicity, with newly cached TCP packets being marked with a resending multiplicity of zero. The TCP ACK cache 132 may hold a number of the latest distinct TCP ACKs 304 (e.g., four TCP ACKs) received from the server, with each TCP ACK marked by its duplicity.

Figure 4A:
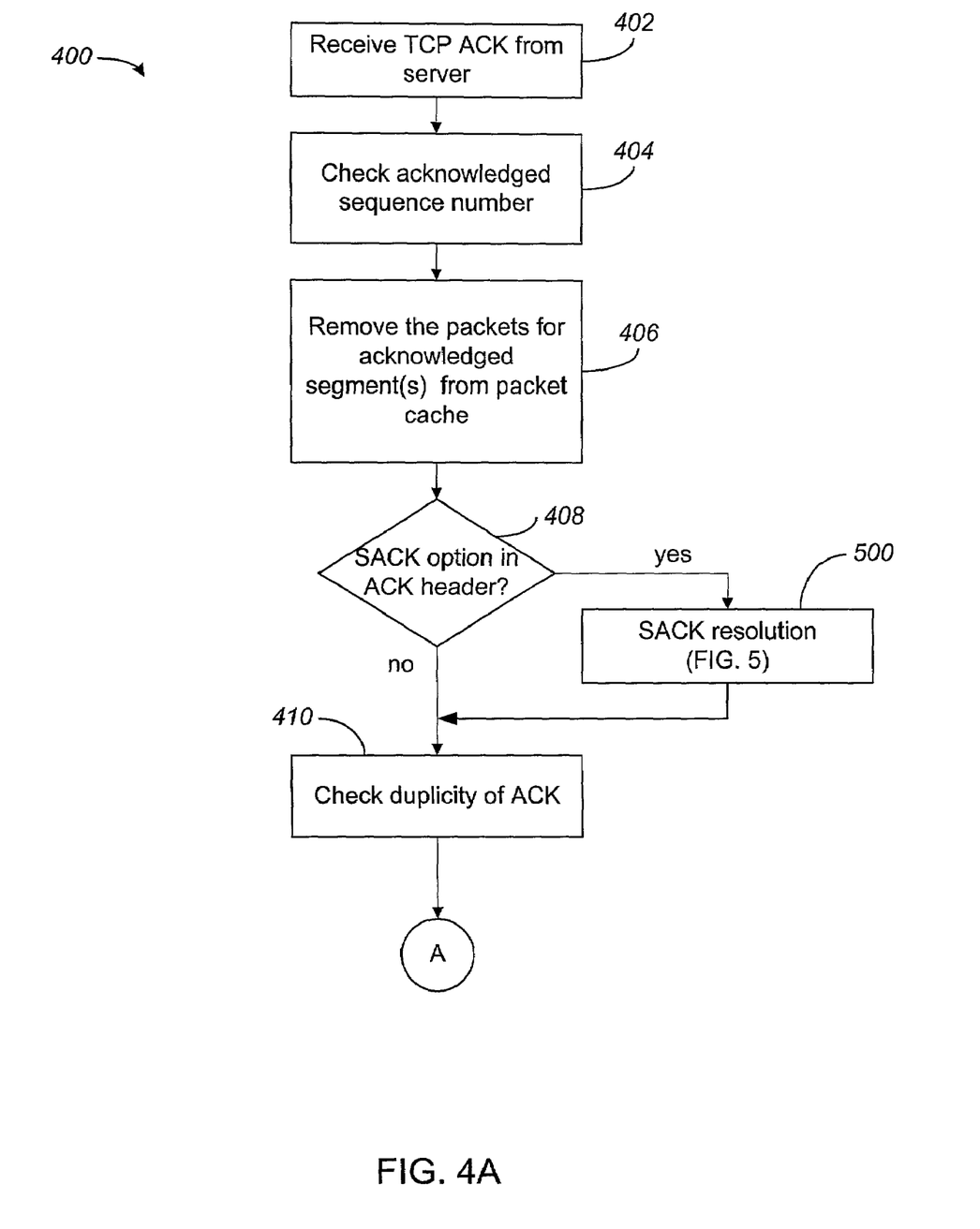
FIGS. 4A, 4B, and 4C are flowcharts describing a retransmission operation according to an embodiment.

FIG. 4 is a flowchart describing a retransmission operation 400 performed by the server-side gateway 112 according to an embodiment. When the gateway 112 receives a TCP ACK for a supported client/server pair from the server 104 (block 402), the gateway checks the acknowledged sequence number (block 404) and removes the TCP packets that do not have greater sequence numbers than the acknowledged sequence number from the TCP packet cache 130 (block 406).

Figure 5:
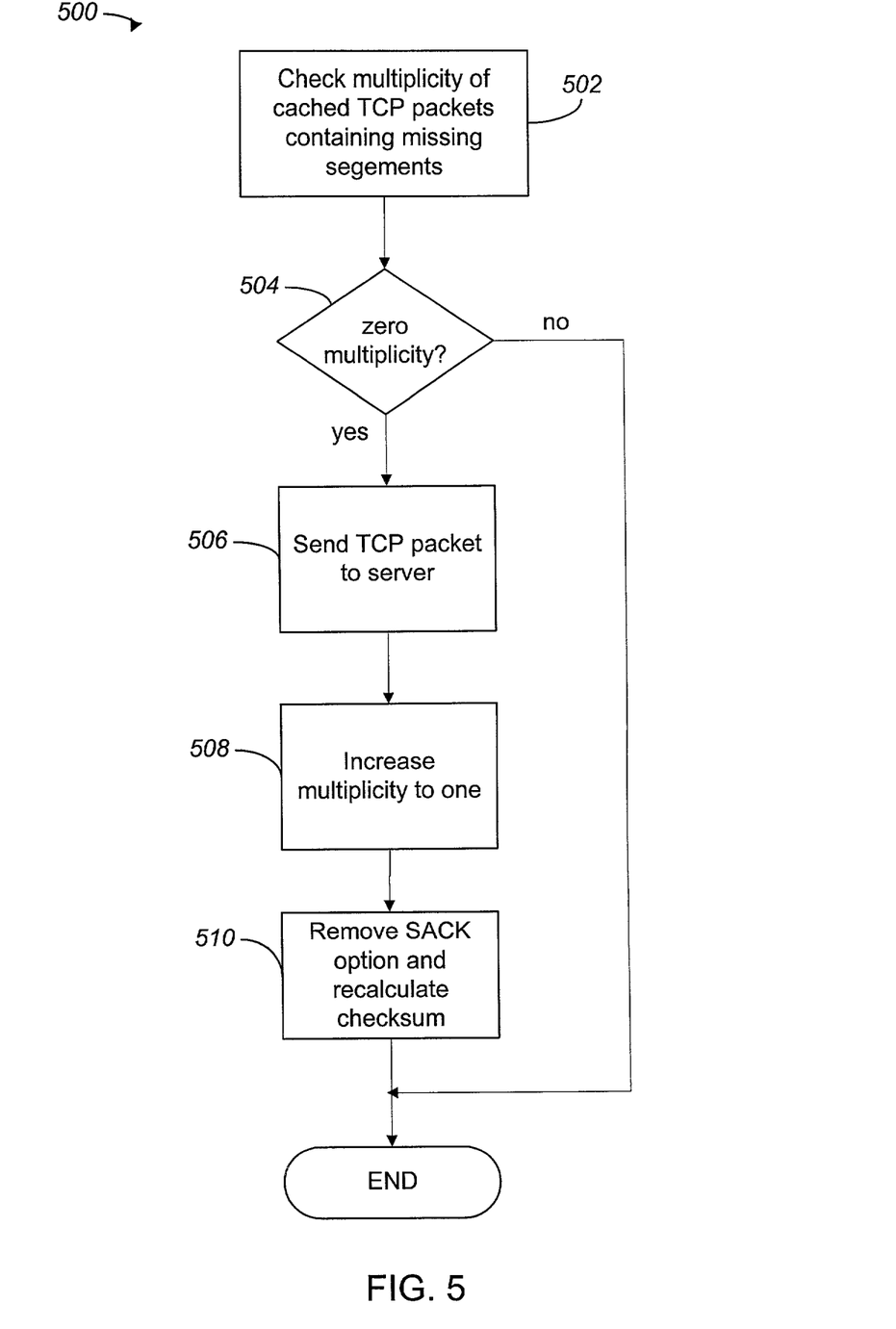
FIG. 5 is a block diagram describing a selective acknowledgment (SACK) handling operation according to an embodiment.

The gateway 112 checks the TCP ACK header to see if the SACK option exists (block 408). If so, it performs a SACK resolution operation 500, as shown in FIG. 5. The gateway 112 checks the resending multiplicity of the cached packets that contain the missing segment(s) (block 502). For any packet determined to have zero multiplicity (block 504), the gateway sends that packet to the server 104 (block 506) and increases the packet's resending multiplicity to one (block 508). The gateway 112 then removes the SACK option from the ACK header and recalculates the checksum and any other parameters for the TCP packets that are impacted by the SACK remove (block 510).

The server 104 may indicate that segments were received out of order by sending an immediate acknowledgment (duplicate ACK) when an out of order segment is received. Since the client does not know whether a duplicate ACK is caused by a lost segment or just a reordering of segments, the client may wait for a small number of ACKs to be received. It is assumed that if there is a reordering of segments, there will be only one or two duplicate ACKs before the reordered segment is processed, which will then generate a new ACK. If three or more duplicate ACKs are received in a row, it is a strong indication that a segment has been lost. In that case, the client 102 may then initiate a fast retransmission and recovery algorithm to resend the missing segment in TCP packet(s).

Figure 4B:
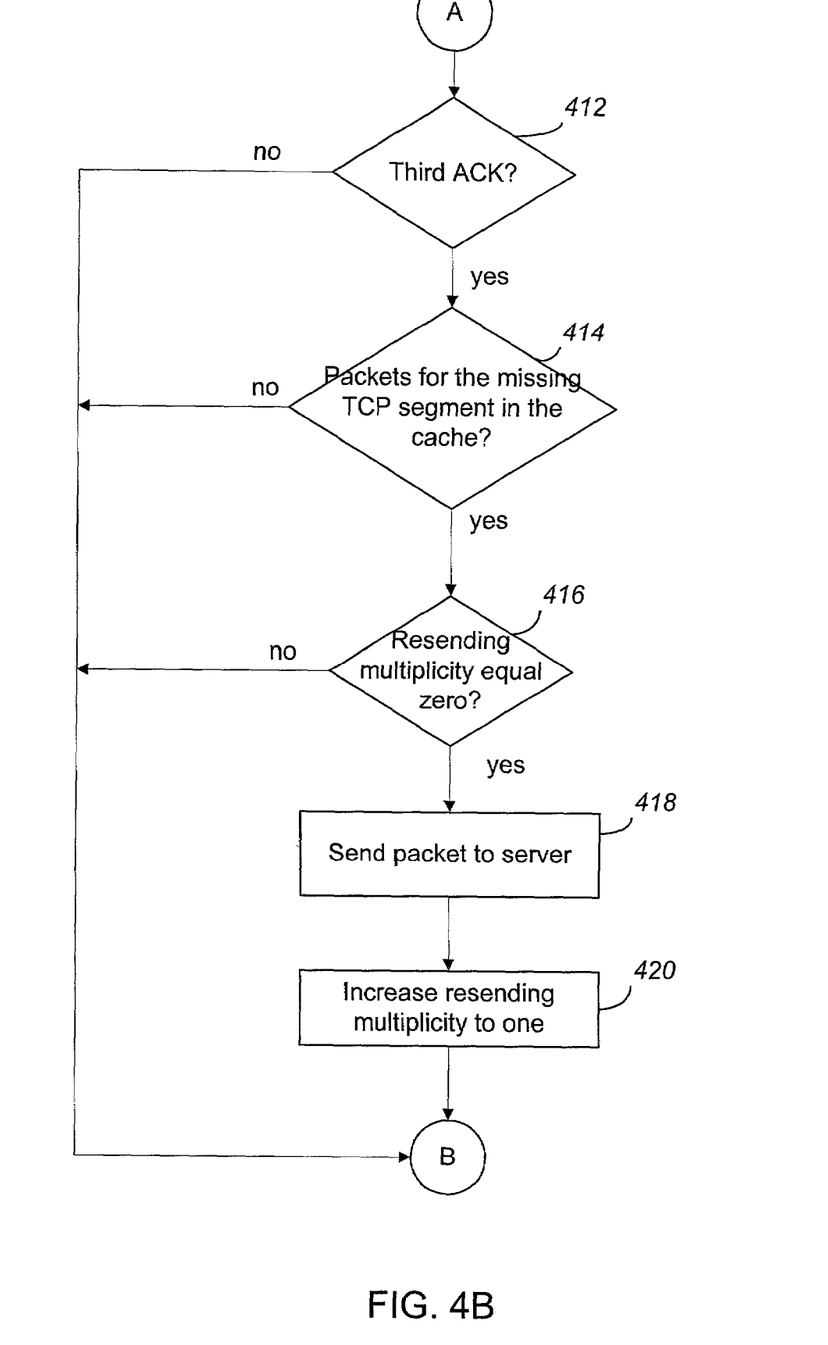

In the present embodiment, the gateway 112, rather than the client 102, determines if a TCP packet must be resent in response to a duplicate ACK sent by the server. The gateway 112 checks the duplicity of the ACK (block 410). If the ACK has a duplicity of three (block 412), the gateway checks the packets in the packet cache 130 to determine if any of the cached packets contain the missing TCP segment (block 414). If the gateway 112 finds a packet including the missing segment, and determines that packet has a resending multiplicity of zero (block 416), the gateway 112 sends the packet to the server (block 418) and increases the resending multiplicity of the packet to one (block 420).

After checking the duplicity of the ACK, and resending the packet if appropriate (blocks 410–420), the gateway 112 determines whether there is an entry for the ACK in the ACK cache 132 (block 422). If so, it increases the duplicity value for that entry by one (block 428). Otherwise, the gateway generates an entry for the ACK in the ACK cache and assigns it a duplicity value of zero (block 424), and removes the oldest ACK entry in the ACK cache 132 (block 426).

Figure 4C:
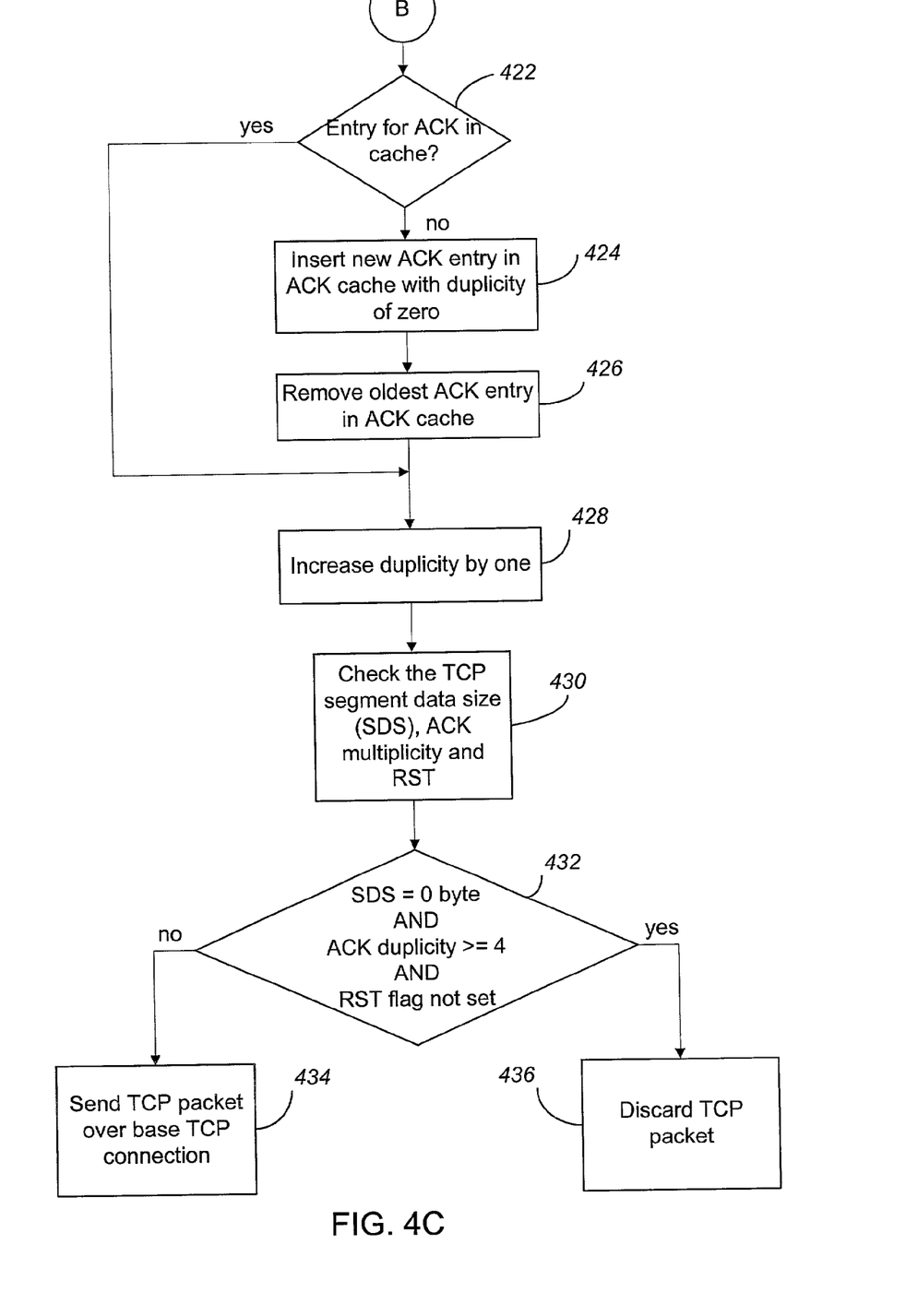

Whether an entry for the ACK existed in the ACK cache or not, the gateway 112 determines whether to drop or to send the TCP packet including the TCP ACK (block 420) to the client 102. The gateway 112 checks the TCP segment data size, ACK duplicity, and whether a reset (RST) flag included with the TCP packet is set (block 430). If the packet has zero bytes of segment data, a duplicity over four, and the RST flag is not set, then the gateway discards the TCP packet (block 434). The TCP packet can be safely dropped because the TCP packet has zero bytes of segment data. Furthermore, the ACK has already been sent at least twice for the proper connection (because the RST flag was not set).

If any one of the three conditions is false but the ACK duplicity equals three, then the gateway 112 determines the data size and reset flag of the packet (block 436). If the data size of the packet is zero and reset flag is not set, then the gateway 112 still discards the packet. Otherwise, the gateway 112 relays the TCP packet to the client-side gateway 110 and places the packet in the packet cache 132.

Figure 6:
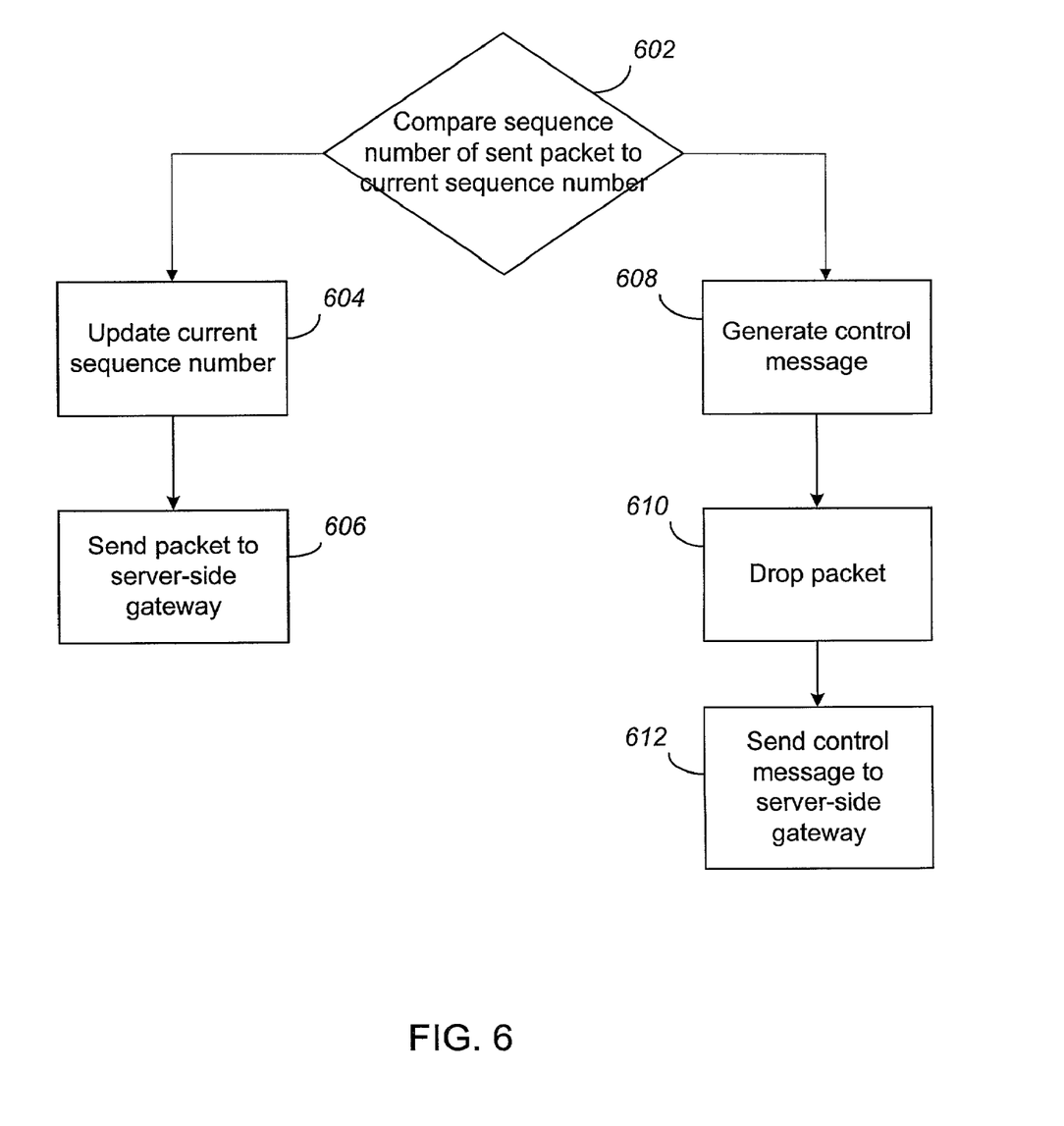
FIG. 6 is a flowchart describing a timeout retransmission operation at a client-side gateway according to an embodiment.

If the client 102 does not receive an ACK for a transmitted TCP segment from the server 104 within the timeout period, the client may attempt to resend the segment. In an embodiment, the client-side gateway 110 stores the largest TCP segment sequence number so far sent by the mobile device 120 for the client/server pair (the mobile device may have more than one TCP client). When the client-side gateway 110 in the mobile device 120 receives a TCP packet from the client 102 for a supported client/server pair, the gateway 110 checks whether the packet is a resent packet by comparing the packet's sequence number with the current recorded largest sequence number 306 for the client/server pair (block 602), as shown in FIG. 6.

If the sequence number is larger than the current sequence number at the gateway 110 for the particular client/server pair, it is assumed that the packet has not been previously sent, and the gateway 110 updates the current sequence number for the particular client/server pair with the sequence number in the new packet (block 604) and sends the packet to the server-side gateway 112 across the base TCP connection 106 (block 606).

If the sequence number is less than the current sequence number for the particular client/server pair, then it is assumed that the packet has been previously sent, and as such, may be stored in the packet cache 132 at the server-side gateway 112. Rather than resend the entire packet, the client-side gateway 110 may create a control message that identifies the resent packet (block 608), drop the packet (block 610), and send the control message instead (block 612). The control message may be generated from, for example, the client and server addresses, port numbers, and the sequence number.

Figure 7:
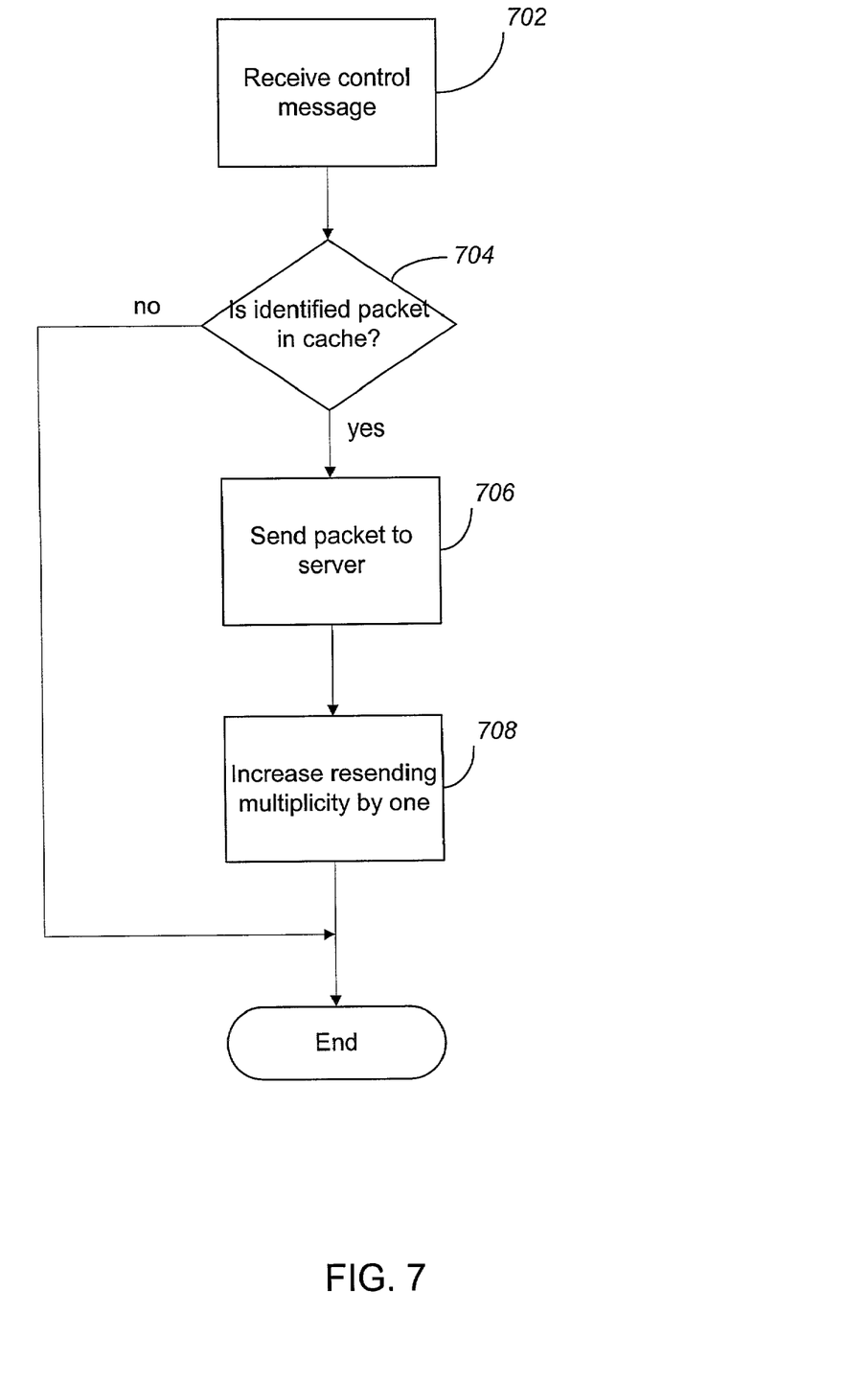
FIG. 7 is a flowchart describing a timeout retransmission operation at a server-side gateway according to an embodiment.

As shown in FIG. 7, when the server-side gateway 112 receives the control message (block 702), the gateway 112 determines whether the TCP packet identified by the control message is in the packet cache 132 (block 704). If so, the gateway 112 sends the packet to the server 104 (block 706) and increases the packet's resending multiplicity by one (block 708). Otherwise, the gateway does nothing since the server 104 may have already acknowledged the packet and the ACK is on its way to the client 102.

The elements in FIG. 1 may be implemented in a variety of ways. The gateways 110 and 112 are not limited to communicating with each other across the base TCP connection 106 using the TCP protocol. Any reliable protocol including, for example, modified forms of TCP, reliable User Datagram Protocol (UDP), reliable layer two links, and other similar protocols can be used in the network configuration 100 and adapted to the described examples. Reliability in this context generally refers to error detection, flow control, and packet recovery.

The network 100 may include any kind and any combination of networks such as an Internet, a local network, a private network, a public network, or other similar network. Communications through the network 100 may be secured with a mechanism such as Transport Layer Security/Secure Socket Layer (TLS/SSL), wireless TLS (WTLS), or secure Hypertext Transfer Protocol (S-HTTP). The subnet 130 may include any portion of a network that shares an independent, interconnected segment or domain such as a local area network (LAN) having a common address prefix or other similar network.

The communication links 106 and 108 may include any kind and any combination of communication links such as modem links, Ethernet links, cables, point-to-point links, infrared connections, fiber optic links, cellular links, satellite links, and other similar links.

A number of embodiments have been described. Nevertheless, it will be understood that various modifications may be made without departing from the spirit and scope of the invention. Accordingly, other embodiments are within the scope of the following claims.

The invention claimed is:

1. A method comprising:
   causing a computer to receive a tunneled packet transmitted from a source via a first transmission protocol over a first communication link;
   causing the computer to store the tunneled packet in a packet cache;
   causing the computer to transmit the stored tunneled packet to a destination via a second transmission protocol over a second communication link;
   receiving two or more acknowledgements of the transmission of the stored tunneled packet from the destination;
   causing the computer to resend the stored tunneled packet to the destination in response to one or more acknowledgments received after a first of the received acknowledgments; and
   causing the computer to store the first received acknowledgement in an acknowledgment cache and mark the stored first acknowledgement with an indication of a number of times acknowledgments have been received for the stored tunneled packet.

2. The method of claim 1, wherein the first and second transmission protocols comprise the Transmission Control Protocol (TCP).

3. The method of claim 2, wherein the first communication link comprises a TCP-in-TCP tunnel.

4. The method of claim 1, wherein the acknowledgments comprise selective acknowledgments (SACK).

5. The method of claim 1, wherein the source comprises a Transmission Control Protocol (TOP) client and the destination comprises a TOP server.

6. The method of claim 5, wherein the TCP client resides on a mobile device.

7. The method of claim 1, further comprising causing the computer to delete the stored tunneled packet in response to receiving the first acknowledgment from the destination.

8. The method of claim 1, further comprising causing the computer to receive a plurality of tunneled packets transmitted from the source via the first transmission protocol over the first communication link.

9. The method of claim 8, further comprising causing the computer to store the plurality of tunneled packets.

10. The method of claim 9, further comprising causing the computer to transmit the plurality of tunneled packets to the destination via the second transmission protocol over the second communication link.

11. The method of claim 10, further comprising causing the computer to receive a control message from the source in response to the source not receiving a message acknowledging receipt of a first packet from the destination within a timeout period, said control message identifying the first packet.

12. The method of claim 11, further comprising causing the computer to resend one of the stored tunneled packets to the destination in response to identifying said one of the stored tunneled packets as the first packet.

13. Apparatus comprising:
   a first port operative to communicate with a source via a first transmission protocol over a first communication link;
   a second port operative to communicate with a destination via a second transmission protocol over a second communication link;

a first storage device operative to store a plurality of tunneled packets received from the source in a packet cache and to store acknowledgements received from the destination marked with their multiplicity in an acknowledgement cache; and a retransmission controller operative to resend a stored tunneled packet to the destination in response to receipt of a duplicate acknowledgment for the stored tunneled packet and operative to mark the stored acknowledgment with an indication of a number of times acknowledgments have been received for the stored tunneled packet.

14. The apparatus of claim 13, wherein the first and second transmission protocols comprise the Transmission Control Protocol (TCP).

15. The apparatus of claim 13, wherein the acknowledgments comprise selective acknowledgments (SACK).

16. The apparatus of claim 13, wherein the retransmission controller is operative to resend a stored tunneled packet to the destination in response to receiving a control message from the source identifying said stored tunneled packet.

17. The apparatus of claim 13, wherein the first port is operative to receive tunneled packets from a mobile device, said mobile device including the source and a gateway.

18. An article comprising a machine-readable medium which contains machine-executable instructions, the instructions causing a machine to:

receive a tunneled packet transmitted from a source via a first transmission protocol over a first communication link;

store the tunneled packet in a packet cache;

transmit the stored tunneled packet to a destination via a second transmission protocol over a second communication link;

receive two or more acknowledgments of the transmission of the stored tunneled packet from the destination;

resend the stored tunneled packet to the destination in response to one or more acknowledgements received after a first of the received acknowledgements; and store the first received acknowledgment in an acknowledgment cache and mark the stored first acknowledgment with an indication of a number of times acknowledgements have been received for the stored tunneled packet.

19. The article of claim 18, wherein the first and second transmission protocols comprise the Transmission Control Protocol (TCP).

20. The article of claim 19, wherein the source comprises a TCP client residing on a mobile device, and wherein the destination comprises a TCF server.

21. The article of claim 18, further comprising instructions causing the machine to receive a plurality of tunneled packets transmitted from the source via the first transmission protocol over the first communication link.

22. The article of claim 21, further comprising instructions causing the machine to store the plurality of tunneled packets.

23. The article of claim 22, further comprising instructions causing the machine to transmit the plurality of tunneled packets to the destination via the second transmission protocol over the second communication link.

24. The article of claim 23, further comprising instructions causing the machine to receive a control message from the source in response to the source not receiving a message acknowledging receipt of a first packet from the destination within a timeout period, said control message identifying the first packet.

25. The article of claim 24, further comprising instructions causing the machine to resend one of the stored tunneled packets to the destination in response to identifying said one of the stored tunneled packets as the first packet.

* * * * *